(12) United States Patent
Diegel et al.

(10) Patent No.: US 8,948,347 B2
(45) Date of Patent: Feb. 3, 2015

(54) METHOD AND DEVICE FOR CHECKING THE CONNECTION OF A POSITIVE SUPPLY VOLTAGE TO A SUBSCRIBER ACCESS LINE COMPRISING A PLURALITY OF WIRES

(75) Inventors: Heike Diegel, Iffeldorf (DE); Rudolf Dollinger, Munich (DE); Roland Krimmer, Germering (DE); Bernhard Sieben, Neuried (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1141 days.

(21) Appl. No.: 11/994,283

(22) PCT Filed: Jun. 14, 2006

(86) PCT No.: PCT/EP2006/063211
§ 371 (c)(1),
(2), (4) Date: Dec. 28, 2007

(87) PCT Pub. No.: WO2007/003492
PCT Pub. Date: Jan. 11, 2007

(65) Prior Publication Data
US 2008/0212745 A1   Sep. 4, 2008

(30) Foreign Application Priority Data
Jun. 30, 2005   (DE) .......................... 10 2005 030 598

(51) Int. Cl.
*H04M 1/24*   (2006.01)
*H04M 3/00*   (2006.01)
*H04M 3/20*   (2006.01)

(52) U.S. Cl.
CPC ............... *H04M 3/005* (2013.01); *H04M 3/20* (2013.01)

USPC ........................ 379/9.06; 379/24; 379/32.04

(58) Field of Classification Search
USPC ....................... 379/413, 399.01, 27.01, 26.01
See application file for complete search history.

(56) References Cited

U.S. PATENT DOCUMENTS

| 4,562,308 | A | 12/1985 | Kopetzky et al. |
| 5,440,612 | A | 8/1995 | Siligoni et al. |
| 6,144,722 | A * | 11/2000 | Anderson et al. ........... 379/27.01 |
| 6,259,676 | B1 * | 7/2001 | Kellock et al. ................ 370/248 |
| 6,278,769 | B1 * | 8/2001 | Bella .......................... 379/29.11 |

(Continued)

FOREIGN PATENT DOCUMENTS

| DE | 3500848 | 7/1986 |
| DE | 69201479 D | 3/1995 |

(Continued)

*Primary Examiner* — Fan Tsang
*Assistant Examiner* — Jeffrey Lytle
(74) *Attorney, Agent, or Firm* — Laurence A. Greenberg; Werner H. Stemer; Ralph E. Locher

(57) ABSTRACT

According to the invention, a user connection cable (TAL) that is to be associated with a user connection circuit (SLIC) and is used for connecting at least one user (TN) to at least one communication network is verified regarding switching on of a positive distribution voltage in the strands (a, b). The user connection circuit (SLIC) is initially switched to the silent interval mode and a test impedance (I) is switched between the strands (a, b) of the user connection cable (TAL), whereupon the current (i) flowing across the strands (a, b) and the voltage (u) to ground of a strand (b) are measured. Advantageously, the measurements are taken via measuring devices disposed on the user connection subassembly (SLMA).

11 Claims, 2 Drawing Sheets

(56) References Cited

U.S. PATENT DOCUMENTS

| | | | |
|---|---|---|---|
| 6,434,232 B1 * | 8/2002 | Ludeman | 379/399.01 |
| 6,519,322 B1 * | 2/2003 | Ludeman | 379/27.01 |
| 6,665,398 B1 * | 12/2003 | Ludeman | 379/399.01 |
| 6,735,302 B1 * | 5/2004 | Caine et al. | 379/405 |
| 7,218,713 B1 * | 5/2007 | Dupuie | 379/142.13 |
| 2002/0048362 A1 * | 4/2002 | Pruecklmayer et al. | 379/399.01 |
| 2002/0094077 A1 * | 7/2002 | Kunisch | 379/387.01 |
| 2002/0141542 A1 * | 10/2002 | Angliss et al. | 379/26.02 |
| 2003/0095655 A1 * | 5/2003 | Noguchi et al. | 379/387.01 |
| 2003/0194059 A1 * | 10/2003 | Ingalsbe et al. | 379/1.03 |
| 2005/0135602 A1 * | 6/2005 | Bailey | 379/399.01 |
| 2007/0263778 A1 * | 11/2007 | Aydin et al. | 379/9.02 |
| 2008/0205631 A1 * | 8/2008 | Francheschini et al. | 379/377 |

FOREIGN PATENT DOCUMENTS

| | | |
|---|---|---|
| DE | 69201479 T | 9/1995 |
| EP | 0087784 A2 | 9/1983 |
| EP | 0 543 161 A2 | 5/1993 |
| IT | 1252125 B | 6/1995 |

* cited by examiner

US 8,948,347 B2

METHOD AND DEVICE FOR CHECKING THE CONNECTION OF A POSITIVE SUPPLY VOLTAGE TO A SUBSCRIBER ACCESS LINE COMPRISING A PLURALITY OF WIRES

CLAIM FOR PRIORITY

This application is a national stage application of PCT/EP2006/063211, filed Jun. 14, 2006, which claims the benefit of priority to German Application 10 2005 030 598.9, filed Jun. 30, 2005, the contents of which are hereby incorporated by reference.

TECHNICAL FIELD OF THE INVENTION

The invention relates to a method and a device for checking the connection of a positive supply voltage to a subscriber access line which has a plurality of wires, for connection of at least one subscriber to at least one communication network.

BACKGROUND OF THE INVENTION

The operators of communication networks such as the conventional telephone network often provide the subscribers or customers not only with useful data transmission (speech in the telephone network) but also with a large number of other services or subscriber service features. These services include, for example, conference circuits, the transmission or suppression of telephone numbers, call forwarding or the charge pulse.

Inter alia, the characteristics of the subscriber line interface circuit (SLIC) and of the subscriber access line from the operator of the telephone network must be checked in the event of subscriber problems or else in the course of routine checking or monitoring of these guaranteed services. The subscriber access line connects at least one terminal of the corresponding subscriber to the associated subscriber line interface circuits in the switching center.

During a check such as this of the characteristics of the subscriber access line, connected terminals should, however, not respond, that is to say, for example, no call signal should be generated.

One of the tests during a check such as this is to investigate the behavior of the subscriber line interface circuit and of the subscriber access line connected to it when a positive supply voltage is connected.

Conventional test procedures associated with the prior art disadvantageously require an external test unit or measurement device for this purpose. This is connected to the appropriate subscriber line module analogue, and the positive ringing voltage is then measured by means of this measurement device. If the ringing voltage does not reach a specific threshold value, then this makes it possible to deduce that there is a fault on the positive supply voltage. In order to prevent the corresponding terminal of the contracted subscriber from reacting to the ringing voltage, the subscriber access line of the subscriber must additionally be decoupled from the switching center during the test process.

SUMMARY OF THE INVENTION

The invention relates to a method for checking the connection of a positive supply voltage to a subscriber access line.

In one embodiment according to the invention, there is a method for checking the connection of a supply voltage to a subscriber access line which has a plurality of wires, for connection of at least one subscriber to at least one communication network, an impedance (I) is connected between two wires (a, b) of the subscriber access line (TAL), the subscriber access line (TAL) is switched to a call pause mode, and the current flowing in the wires (a, b) of the subscriber access line (TAL) and/or the voltage between a wire (6) and ground are/is determined.

One advantage of the invention is that the connection of the supply voltage can be checked without an external measurement device.

The check is advantageously carried out in this case by a subscriber line module analogue associated with the subscriber access line.

DETAILED DESCRIPTION OF THE INVENTION

According to one exemplary application of the method according to the invention, a two-stage test is used to investigate whether, on the one hand, the subscriber line interface circuit is serviceable, that is to say it can provide the (for example positive) supply voltage required on the subscriber access line. On the other hand, the test investigates whether the supply voltage produced by the subscriber line interface circuit is also actually present on the subscriber access line.

Figure 1:
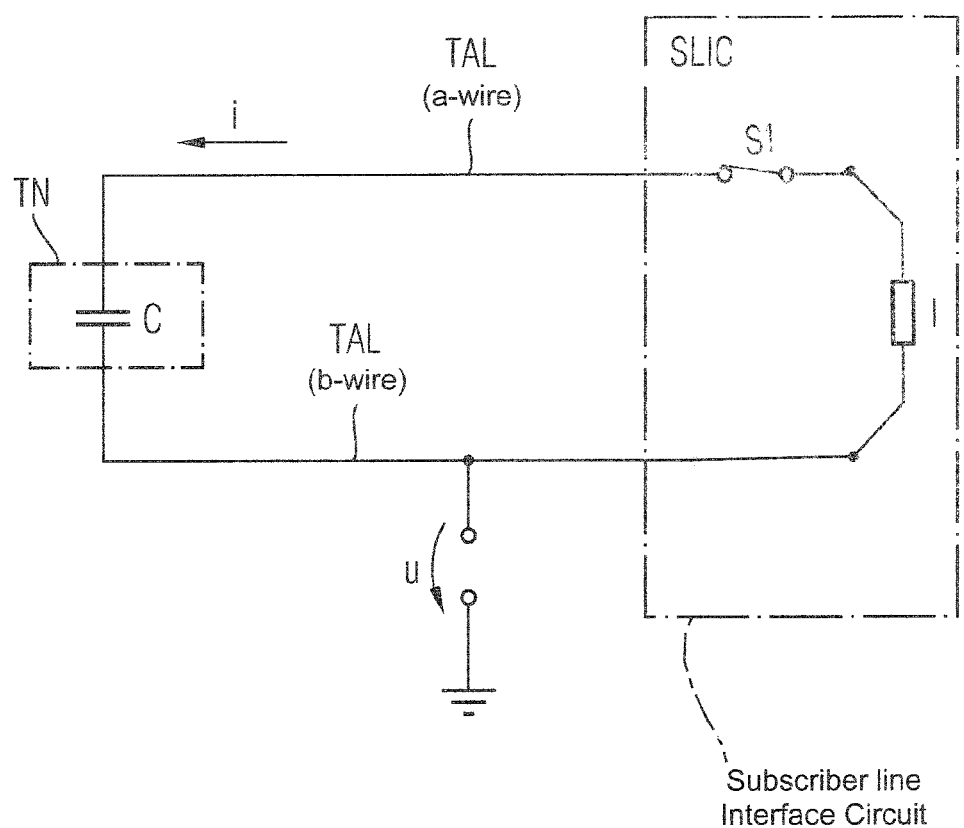
FIG. 1 shows an exemplary subscriber access arranged in a communication network in the form of an analogue subscriber access for a telephone network, and a test impedance which is connected according to the invention.

In FIG. 1, a subscriber TN is connected via the corresponding subscriber access line TAL to a subscriber line interface circuit SLIC associated with the switching device (not illustrated). The access line TAL itself normally comprises conventional copper-double-wires, with the two connections being referred to as the a-wire and the b-wire. Furthermore, the subscriber line interface circuit SLIC is normally located on a so-called subscriber line module analogue (SLMA).

The terminal (not illustrated), which is connected at the subscriber end to the subscriber access line TAL, of a subscriber TN corresponds in terms of circuitry to a capacitance C connected between the ends of the a-wire and the b-wire. This capacitance C is also referred to as a ring capacitance, since this is that component of the terminal which detects the alternating voltage applied to the subscriber access line TAL by the switching center when an incoming call occurs, and thus identifies the incoming call.

Figure 2:
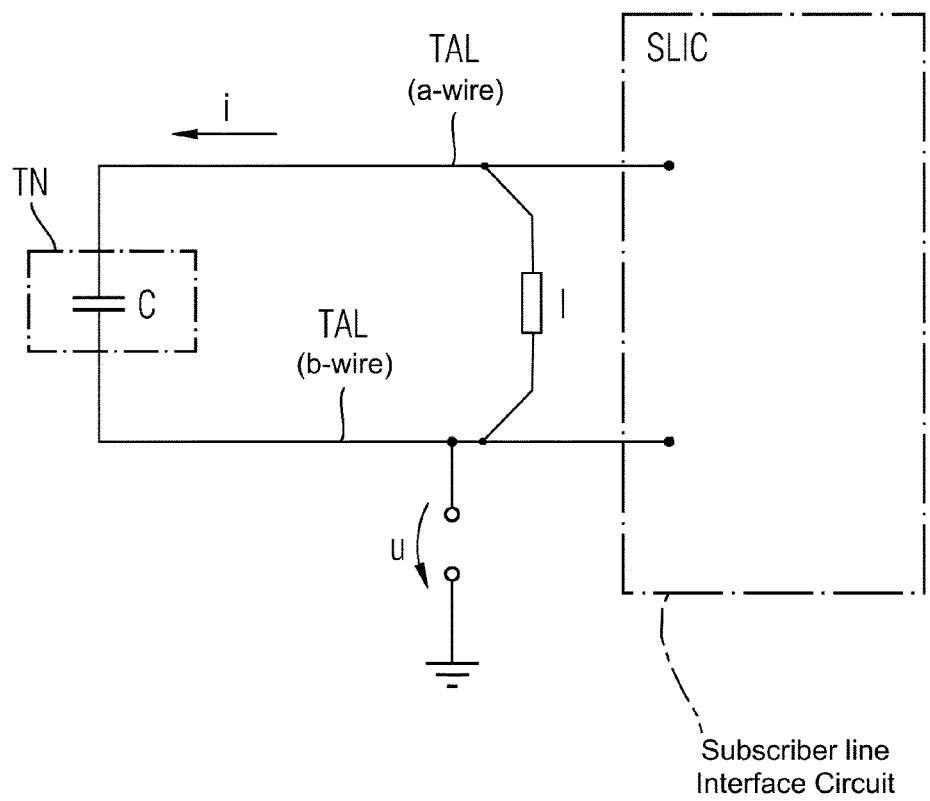
FIG. 2 shows an exemplary subscriber access arranged in a communication network in the form of an analogue subscriber access for a telephone network, and a test impedance arranged externally from the subscriber line module analogue.

Furthermore, FIG. 1 shows an impedance I which is connected between the two wires a and b of the subscriber access line when carrying out the method according to the invention. This impedance may either be arranged externally, as shown in FIG. 2, or else may be part of the subscriber line module analogue SLMA, as shown in FIG. 1.

By way of example, at the start of the method according to the invention, the subscriber access line TAL to be checked is now switched to the so-called "call pause" or "boost" mode by switch S1. In this mode, only the direct-current component of the ringing voltage produced by the subscriber line module analogue or switching device is applied to the subscriber access line TAL. This call pause state is normally that state which results during normal operation of the telephone network on a subscriber access line TAL between two successive ringing signals (that is to say for example between two successive ringing tones).

The current i flowing via the a wire and the b wire is then measured by means of a suitable test set, which can advantageously be arranged on the subscriber line module analogue SLMA. This first measurement step is used to verify whether the subscribe line interface circuit SLIC is fundamentally able to feed a predeterminable current to the subscriber access line TAL during the call pause mode.

In a second step, by way of example, the voltage u between the b-wire and ground is determined. This measurement can also advantageously be carried out by means of a test set (not illustrated) arranged on the subscriber line module analogue SLMA. By determining the voltage u between the b wire of the subscriber access line TAL and ground, it is then possible to check whether the call pause mode has also actually been selected, that is to say a check is carried out to determine whether the predetermined DC voltage is present on the subscriber access line, that is to say the subscriber line interface circuit SLIC has been switched to the call pause mode correctly.

In comparison to the methods known from the prior art for checking the connection of the positive supply voltage to the supply access line, the method according to the invention makes it possible, inter alia, to avoid the need for the external test set as mentioned above. Furthermore, the method according to the invention advantageously ensures better reliability of the check, and cost savings, in comparison to conventional methods.

The invention claimed is:

1. A method for checking the connection of a supply voltage from a subscriber line interface circuit to a subscriber access line which has a plurality of wires for connection of at least one subscriber to at least one communication network, comprising, without decoupling the subscriber access line from the communication network and without generating a call signal on the subscriber access line:
    connecting an impedance between two wires of the subscriber access line;
    switching the subscriber access line to a call pause mode in which only a direct-current component of a ringing voltage is applied to the subscriber access line;
    determining at least one electrical property, wherein the electrical property is selected from the group consisting of a current flowing in the wires of the subscriber access line and a voltage between one of the wires and ground;
    checking whether or not the supply voltage is present on the subscriber access line; and
    verifying whether or not the subscriber line interface circuit is fundamentally able to feed a pre-determined current to the subscriber line.

2. The method as claimed in claim 1, wherein the method is performed by a subscriber line module analogue associated with the subscriber access line.

3. The method as claimed in claim 1, wherein the impedance is arranged on a subscriber line module analogue.

4. The method as claimed in claim 1, wherein the impedance is arranged externally from a subscriber module analogue.

5. The method as claimed in claim 1, wherein the electrical property is determined without generating a call signal on the subscriber access line.

6. A device for checking the connection of a supply voltage from a subscriber line interface circuit to a subscriber access line which has a plurality of wires for connection of at least one subscriber to at least one communication network, the device having a unit for, without decoupling the subscriber access line from the communication network and without generating a call signal on the subscriber access line:
    connecting an impedances between two wires of the subscriber access line,
    switching the subscriber access line to a call pause mode in which only a direct-current component of a ringing voltage is applied to the subscriber access line,
    determining at least one electrical property, wherein the electrical property is selected from the group consisting of a current flowing in the wires of the subscriber access line and a voltage between one of the wires and ground;
    checking whether or not the supply voltage is present on the subscriber access line; and
    verifying whether or not the subscriber line interface circuit is fundamentally able to feed a pre-determined current to the subscriber line.

7. The device as claimed in claim 6, wherein the device for checking is arranged on a subscriber line module analogue associated with the subscriber access line.

8. The device as claimed in claim 6, wherein the impedance is arranged on a subscriber line module analogue.

9. The device as claimed in claim 6, wherein the impedance is arranged externally from a subscriber line module analogue.

10. The device as claimed in claim 6, wherein the unit is configured to connect the impedance, switch the subscriber access line to the call pause mode, and determine the at least one electrical property in a state in which the subscriber line is not decoupled.

11. The device as claimed in claim 6, wherein the unit is configured to determine the electrical property without generating a call signal on the subscriber access line.

* * * * *